United States Patent [19]

Floessel et al.

[11] 3,827,731

[45] Aug. 6, 1974

[54] EXPANSION JOINT FOR TUBULAR INSULATING GAS-FILLED ENCLOSURE FOR HIGH-VOLTAGE CONDUCTOR

[75] Inventors: Carl Dieter Floessel, Fislisbach; Klaus Floessel, Wettingen, both of Switzerland

[73] Assignee: BBC Brown Boveri & Company Limited, Baden, Switzerland

[22] Filed: Apr. 19, 1973

[21] Appl. No.: 352,669

[30] Foreign Application Priority Data

May 4, 1972 Switzerland................. 6609/72

[52] U.S. Cl. ................................ 285/187, 285/225
[51] Int. Cl. ........................................... F16l 55/00
[58] Field of Search ...... 285/187, 302, DIG. 2, 226, 285/223, 225; 403/80

[56] References Cited
UNITED STATES PATENTS

| | | | |
|---|---|---|---|
| 2,145,541 | 1/1939 | Forsberg.................. | 285/223 X |
| 2,841,419 | 7/1958 | Jay....................... | 285/225 |
| 3,053,554 | 9/1962 | Magos et al. ............ | 285/226 X |
| 3,127,182 | 3/1964 | Wardleigh............... | 285/187 X |
| 3,630,533 | 12/1971 | Butler.................... | 285/187 X |

FOREIGN PATENTS OR APPLICATIONS

| | | | |
|---|---|---|---|
| 2,029,699 | 3/1971 | Germany................ | 285/187 |

*Primary Examiner*—Alfred R. Guest
*Attorney, Agent, or Firm*—Pierce, Scheffler & Parker

[57] ABSTRACT

An expansion joint housing structure connecting the end portions of tubular sections of an enclosure for an electrical conductor supported concentrically therein in which the end of one section of the enclosure is rigidly connected to the joint housing structure while the end of an adjacent section of the enclosure is entered into the joint housing structure and fitted with a piston for longitudinal movement relative thereto in response to expansion and contraction of the enclosure due to the heating effect of the conductor current. A flexible sleeve membrane turned back upon itself is located in an annular gap formed between a part of the piston and the inner surface of the joint housing structure which serves as the piston cylinder, and functions as a seal between the relatively movable parts of the expansion joint. To prevent the membrane from turning completely inside-out while the enclosure is evacuated during the assembly process of the conductor within the enclosure, and prior to filling with the insulating gas, a support ring for it is provided, this ring including a cylindric portion enterable into the gap formed at the turned-back end of the membrane, and being mounted on the piston for movement in a longitudinal direction relative thereto by means including loading springs which load the support ring in the direction of the turned-back end of the membrane.

4 Claims, 3 Drawing Figures

PATENTED AUG 6 1974          3,827,731

EXPANSION JOINT FOR TUBULAR INSULATING GAS-FILLED ENCLOSURE FOR HIGH-VOLTAGE CONDUCTOR

This invention relates to an improved construction for an expansion joint for a tubular insulating-gas-filled enclosure of a high-voltage conductor, the conductor being insulated within the enclosure and a flexible sleeve membrane forming the seal between the relatively moving portions of the enclosure.

Expansion joints in the form of bellows are known from German published patent specification (DT-AS No. 1,515,367) for compensating relative expansion between sections of gastight enclosures surrounding high-voltage conductors employed as busbars. This method, however, is comparatively expensive and complicated, mainly because of the large diameter of the bellows, which is approximately the same as the diameter of the enclosure. Also, the compensating movement of these bellows is relatively small if they are designed for an elevated internal gas pressure. A proposal has therefore already been made for expansion joints of this kind whereby a flexible roll sleeve membrane is used as a seal between the relatively moving portions of the enclosure. Furthermore, a support device for the roll sleeve membrane has been proposed which can be operated voluntarily from outside in order to prevent the sleeve membrane from turning inside out when the enclosure is evacuated prior to commissioning the high-voltage conductor. Because this operation is external, however, additional seals are required, and omitting to operate the device can result in damage to the sleeve membrane, in which case the expansion joint becomes unserviceable.

The present invention avoids these disadvantages in that no voluntary actuation is necessary and the entire support device is contained inside the enclosure and functions automatically. This is achieved by the invention in that an annular gap formed by the flexible roll sleeve membrane contains a supporting ring which is held by a spring against the membrane within a definable lower temperature range, this ring being fixed to the end of the section of the enclosure extending into the housing of the expansion joint, and its movement being restricted in such a manner that in a higher temperature range corresponding to the normal operating condition of the high-voltage conductor the ring does not bear on the sleeve membrane. An example of the invention is shown in the accompanying drawings, in which:

Figure 1:
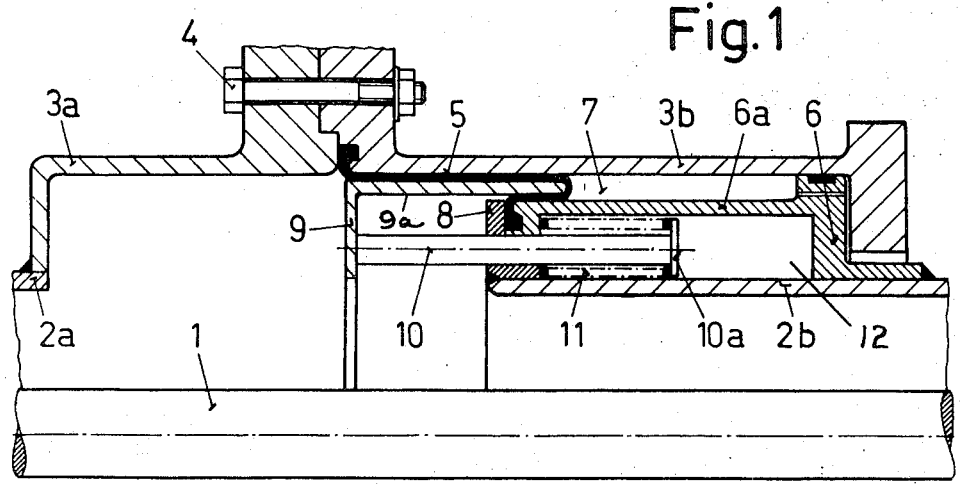
FIG. 1 shows a longitudinal section through the expansion joint in a position corresponding approximately to the lower limit of the lower temperature range.

In the drawings, the same parts have been designated throughout by the same reference characters. The electrical conductor 1 which passes through the tubular enclosure sections 2a, 2b connected in end-to-end relation by the expansion joint structure, is supported concentrically within the sections 2a, 2b by means which are well known per se and hence have not been included in the interest of simplifying the drawings. The tubular enclosure section 2a is rigidly fixed at its end to housing section 3a of the expansion joint by any suitable means such as the welded connection illustrated. The other housing section 3b of the expansion joint structure is joined rigidly to the housing section 3a by interconnecting the flanged ends thereof by means of several circumferentially spaced screw bolts 4 which pass through the flanges. In order to simplify the drawings, however, only one such connecting bolt 4 has been illustrated. The outer end of a flexible sleeve membrane 5, which is capable of being rolled back upon itself, i.e., turned outside in, in a progressive manner, is clamped in a gas-tight manner at the junction between the connected together end faces of the housing parts 3a, 3b.

The end of the tubular enclosure section 2b, which is capable of longitudinal movement relative to and within the expansion joint housing structure 3a, 3b is guided by means of a piston 6, the latter being connected rigidly to the end portion of section 2b such as by welding as illustrated, and being slidable within the housing part 3b which also functions as a cylinder for this piston. Piston 6 is provided with a longitudinal cylindrical extension 6a, the outside diameter of which is smaller than that of part 3b, thus creating an annular gap 7 between housing joint part 3b and piston part 6a which accommodates the flexible sleeve membrane 5 that turns, i.e., rolls inwardly back upon itself as the enclosure sections 2a, 2b expand and contract, in a manner to be described more fully hereafter. The inner end of the sleeve membrane is turned inwardly and is clamped between the end part of the piston extension 6a and a ring 8 which is welded in place onto the end of the enclosure section 2b.

A support ring 9 located within the joint housing 3a, 3b includes a longitudinally extending cylindrical portion 9a which projects into an annular gap formed by the turned-back end of the sleeve membrane 5. This support ring is movable longitudinally within the joint housing and relative also to piston 6, and is guided for movement relative to this piston by means of several circumferentially spaced studs 10 which project longitudinally from the support ring 9 and pass through correspondingly positioned bores in ring 8 into annular space 12 established between the piston projection 6a and the outer surface of the conductor enclosure section 2b. A helical spring 11 surrounds the stud 10, the spring being under compression and having one end thereof stopped by a collar 10a at the end of stud 10 and the other end stopped against an inwardly turned flange on the end of the piston extension 6a. In the interest of simplifying the drawing only one of the studs 10 and its loading spring 11 have been included in the drawing. The springs 11 have a very level characteristic and are so dimensioned that when the enclosure 2a, 2b for the conductor 11 is in an evacuated state, they counteract the external atmospheric pressure exerted upon the sleeve membrane 5, and also supply some additional force.

Figure 2:
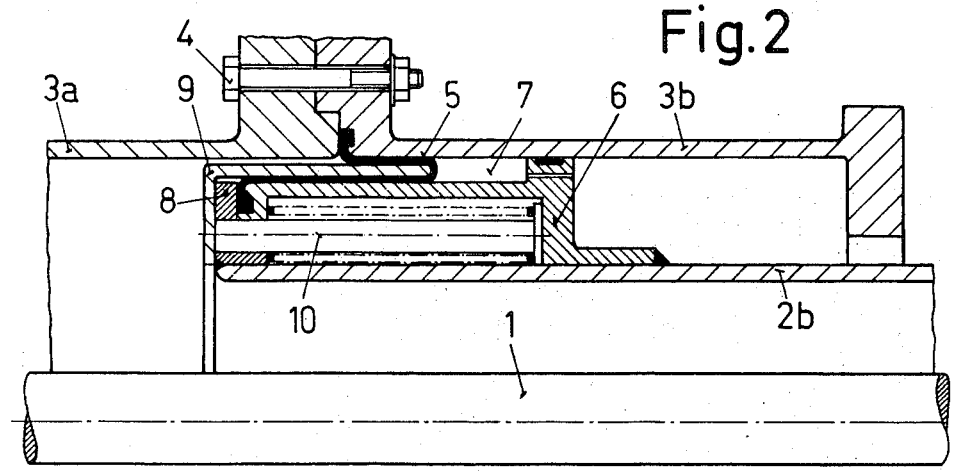
FIG. 2 shows a position corresponding to the upper limit of the lower temperature range within which the high-voltage conductor is assembled, evacuated and filled with gas.
Figure 3:
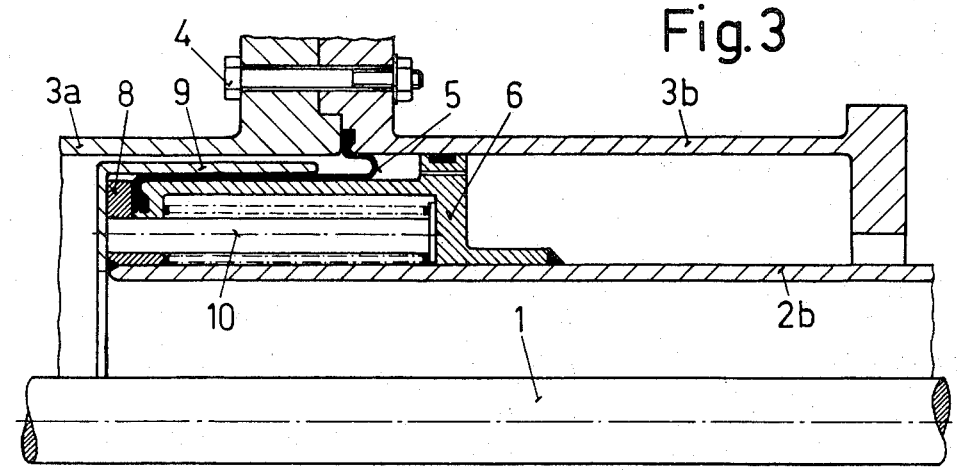
FIG. 3 shows a position when the high-voltage conductor is at its operating temperature.

FIGS. 1 and 2 show extreme positions corresponding to a range of temperatures within which the high-voltage conductor can be assembled, evacuated and charged with gas. In practice this temperature range extends preferably from 0° to 30° C. The sleeve membrane 5 is then automatically prevented from turning inside out by support ring 9. When the high-voltage conductor goes into operation, the heating effect due to I²R losses created by the current being transmitted results in linear expansion of the tubular enclosure. The situation corresponding to this operating condition is shown in FIG. 3, where the support ring 9 is seen to be separated from the membrane 5, allowing the latter to function without being influenced by support ring 9. The distinguishing feature of this upper temperature range, which corresponds to the normal operating condition, is that the collar 10a at the end of stud 10 bears against the left-hand surface of piston 6 so that the support ring 9, moving together with piston 6, is separated from the sleeve membrane 5.

The advantage of this new mode of providing for joint expansion is that the flexible sleeve membrane is supported for automatic and free movement according to the temperature of the high-voltage conductor. The expansion joint is therefore less subject to faults and errors during erection of the high-voltage conductor.

We claim:

1. An expansion joint for and connecting the end portions of tubular sections of an enclosure for an electrical conductor supported concentrically therein and wherein the enclosure is filled with an insulating gas subsequent to evacuation thereof which comprises an expansion joint housing structure interconnecting the end portions of adjacent sections of said conductor enclosure, one end of said joint housing structure being secured to an end portion of one conductor enclosure section and the end portion of the other conductor enclosure section being entered through the opposite end of said joint housing structure for longitudinal movement relative thereto, by a piston member secured to said other conductor enclosure section and which is slidable within a cylindric portion of said joint housing structure in response to expansion and contraction of said conductor enclosure, said piston including a cylindric portion having a diameter less than that of said cylindric portion of said joint housing structure thereby to establish an annular gap therebetween, a flexible sleeve membrane located in said annular gap and which is turned back upon itself to form a seal between the relatively movable parts of the expansion joint, one end of said membrane being fixed to said joint housing structure and the opposite turned-back end thereof being secured to said piston, a support ring for said membrane and which includes a cylindric portion enterable into the gap formed at the turned-back portion of said membrane, means mounting said support ring on said piston for movement in a longitudinal direction relative thereto, and spring means carried by said piston and cooperative with said support ring for loading the latter in the direction of the turned-back end of said membrane.

2. An expansion joint structure as defined in claim 1 wherein said means mounting said support ring on said piston include longitudinally extending studs on said support ring and which are slidable in openings provided in said piston, and wherein said spring means are constituted by a helical spring surrounding each stud within said piston, one end of said spring being stopped by the piston and the other end being stopped by a collar on the stud.

3. An expansion joint structure as defined in claim 2 wherein the openings provided in said piston for receiving said studs are established by an annular space formed between said cylindric portion of said piston and the end portion of said other conductor enclosure section.

4. An expansion joint structure defined in claim 1 wherein expansion of said conductor enclosure sections in response to the normal operating temperature of said conductor effects a separation of the end of said cylindric portion of said support ring from the turned-back end of said membrane.

* * * * *